United States Patent [19]

Bourgogne

[11] Patent Number: 4,916,856
[45] Date of Patent: Apr. 17, 1990

[54] PROCESS FOR THE AUTOMATED GROWING OF A GROUP OF PLANTS AND CORRESPONDING INSTALLATION

[76] Inventor: Pierre M. Bourgogne, 2 bis, Rue des Ponchettes, 06300 Nice, France

[21] Appl. No.: 130,583

[22] Filed: Dec. 9, 1987

Related U.S. Application Data

[63] Continuation-in-part of Ser. No. 800,121, filed as PCT FR85/00039 on Mar. 4, 1985, published as WO85/03843 on Sep. 12, 1985, abandoned.

[30] Foreign Application Priority Data

| Mar. 7, 1984 | [FR] | France | 84 04313 |
| Feb. 27, 1985 | [FR] | France | 85 03245 |
| Mar. 4, 1985 | [EP] | European Pat. Off. | 85430004.3-230 |

[51] Int. Cl.[4] .............................................. A01G 31/02
[52] U.S. Cl. .............................................. 47/65; 47/62; 47/63
[58] Field of Search .............. 47/59, 60, 61, 62, 63, 47/64, 65, 74, 1.4, 17, DIG. 6; 206/88, 89

[56] References Cited

U.S. PATENT DOCUMENTS

| T966,009 | 1/1978 | Gardineer et al. | 406/89 |
| 2,222,310 | 11/1940 | Emery | 47/65 |
| 2,777,253 | 1/1957 | Bensin | 47/DIG. 6 |
| 3,180,688 | 4/1965 | Futer | 406/88 |
| 3,461,605 | 8/1969 | Stanhope | 47/17 |
| 4,028,847 | 6/1977 | Davis et al. | 47/65 |
| 4,035,949 | 7/1977 | Ruthner | 47/60 |
| 4,166,341 | 9/1979 | Vestergaard | 47/59 |
| 4,211,035 | 7/1980 | Small | 47/62 |
| 4,231,202 | 11/1980 | Dube | 47/17 |
| 4,324,069 | 4/1982 | Flagg | 47/62 |
| 4,327,538 | 5/1982 | Milhem et al. | 47/59 |
| 4,337,986 | 7/1982 | Haub et al. | 308/177 |
| 4,348,285 | 9/1982 | Groeneweg et al. | 47/1.4 |
| 4,515,150 | 5/1985 | McGlew et al. | 47/17 |
| 4,517,764 | 5/1985 | Dedolph | 47/74 |

FOREIGN PATENT DOCUMENTS

| 250093 | 2/1966 | Austria | 47/65 |
| K22524 | 10/1956 | Fed. Rep. of Germany | 47/17 |
| 1950918 | 10/1977 | Fed. Rep. of Germany | 406/88 |
| 2132218 | 11/1972 | France | 47/59 |
| 2296370 | 7/1976 | France | 47/65 |
| 2298934 | 8/1976 | France | 47/65 |
| 83639 | 2/1976 | Japan | 47/59 |
| 596519 | 3/1978 | U.S.S.R. | 406/88 |

Primary Examiner—Robert A. Hafer
Assistant Examiner—Kevin G. Rooney

[57] ABSTRACT

The process for the automated growing of a group of plants in an artificial medium which is solid, liquid or a mixture thereof, comprises sowing collectively seeds or planting young plants directly on a region of the artificial medium, with a small spacing therebetween, and displacing said region progressively as a function of the growth of the plants and increasing the area of said region in the longitudinal and transverse directions so that the spacing between the plants increases in these two directions in proportion to the development of the plants until they reach maturity.

52 Claims, 9 Drawing Sheets

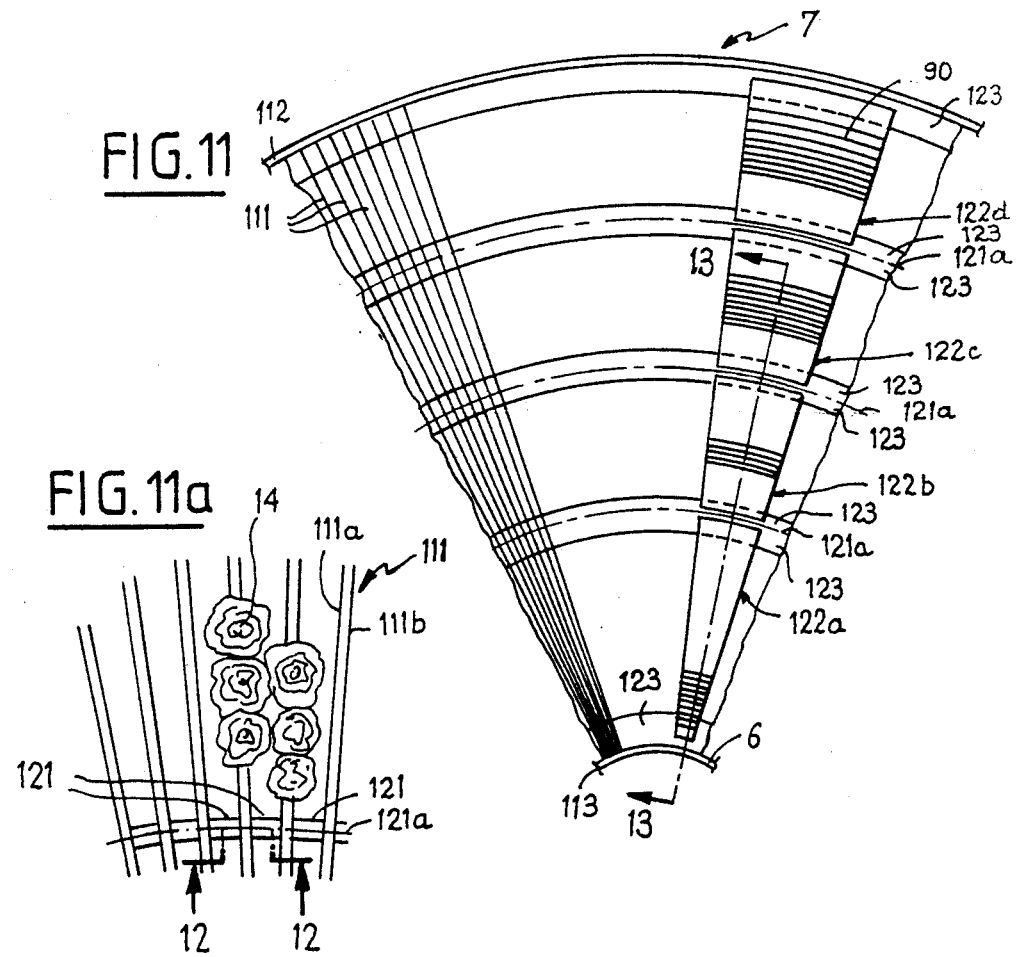
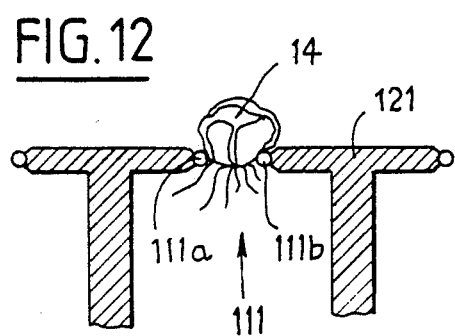

PROCESS FOR THE AUTOMATED GROWING OF A GROUP OF PLANTS AND CORRESPONDING INSTALLATION

This is a continuation in part of my application Ser. No. 800,121, filed as PCT FR 85/00039 on Mar. 4, 1985, published as WO85/03843 on Sep. 12, 1985, now abandoned.

BACKGROUND OF THE INVENTION

The present invention relates to a process for the automated growing of a group of plants and the corresponding installation.

Indeed, several growing methods exist among which may be distinguished the following essential types:

conventional growing in open fields, growing in open ground or in pots but under shelter, and soilless growing or growing in artificial soil under shelter.

Sub-classifications may in particular be distinguished in the last-mentioned method, depending on the temperatures and growing media.

Thus, in the soilless class under shelter, the growing media are varied and may be solid in the form of granulates: sand, gravel, expanded clay, pouzzolana, expanded glass balls, vermiculite, perlite, polystyrene, cork, etc. with a certain proportion of nutrient liquid solution with also liquids with no solid material.

In this particular case of growing, termed hydroponic culture, the growing in effect occurs with no granulate, the roots being directly plunged into this solution.

The advantages of the intensive growing under shelter are already known, and the advantages represented by soilless growing are also understood, but the same drawback remains in all cases: it is indeed necessary to plant the seeds or the young plants widely spaced apart so that at the moment of their maturity they are sufficiently spaced apart, and this requires a large surface area which is in use throughout the duration of the growing.

A partial remedy for such a problem consists in effecting successive sowings and planting outs, but in this case, the needs in labor are considerable, which cancels out some of the advantages that such a method might afford.

Growing processes have therefore been sought which permit a reduction in the planted areas. Thus, U.S. Pat. No. 4,166,341 relates to the individual growing of young plants in porous containers allowing the hydroponic growing thereof. These porous supports travel on mechanical conveyors in continuous U-shaped tunnels, the roots being permanently immersed in a nutrient solution.

While such a system is very perfected as concerns the growing conditions, it does not completely satisfy the desired objectives of reduction in the surface area used by an increase in this area in proportion to the evolution of the young plant and by an increase in the longitudinal and transverse distances. Indeed, the spacing of the young plants is not continuous but is effected in very few successive stages, which reduces the interest thereof and the container remains the same throughout the growth, which prevents any development unless the young plants are transferred to successive containers of larger size. The regulation of the longitudinal spacing of the young plants is possible by mechanically separating the containers, but in the transverse direction it will be understood that such a container cannot solve the problem unless the complete production line is shifted.

Austrian Pat. No. 250,093 discloses a process for growing in a container, but in which the growing medium is reduced in volume. Furthermore, the young plants are placed on suspended devices in which the young plants are superimposed so that the gain in the area is achieved in the direction of the height. To compensate for the small volume of the growing medium, the suspended devices are rendered mobile by mounting on a transfer installation of the type having a closed-loop cable which continuously rotates. At a point of the circuit, a tent with a nutrient solution nourishes the plants with a given periodicity and duration which is a function of the speed of the cable and the length of the container.

It will be understood that such a system remains complex, costly and does not solve the problem of a progressive and proportional increase in the cultivated surface as a function of the growth of the young plant.

SUMMARY OF THE INVENTION

An object of the present invention is therefore to overcome these drawbacks and to provide a growing process whereby it is possible to automatically and permanently adapt the area occupied by a young plant to its instantaneous and real needs in area and to thus achieve a great reduction in the cultivated areas for a given production while ensuring a productivity throughout the year whatever be the climatic conditions.

BRIEF DESCRIPTION OF THE DRAWING

A better understanding of the invention will be had from the following description of a particular embodiment and variants thereof which are given solely by way of example with reference to the accompanying drawings, in which:

FIG. 6 is a diagrammatic view of the forces permitting the displacement of the growing medium according to the installation shown in FIG. 1;

FIG. 7 is a cross sectional view to an enlarged scale of a variant of the young plant harvesting device;

FIG. 11 is a partial top plan view of the fourth embodiment;

FIG. 11a is a partial plan view to an enlarged scale of the installation shown in FIG. 11 showing how the plants are supported on pairs of threads or wires which are only slightly divergent, the divergency being greater between adjacent pairs to allow for growing of the plants;

FIG. 12 is a sectional view to a still larger scale of the support for the threads or wires taken on line 12—12 of FIG. 11a;

DESCRIPTION OF THE PREFERRED EMBODIMENTS

Figure 1:
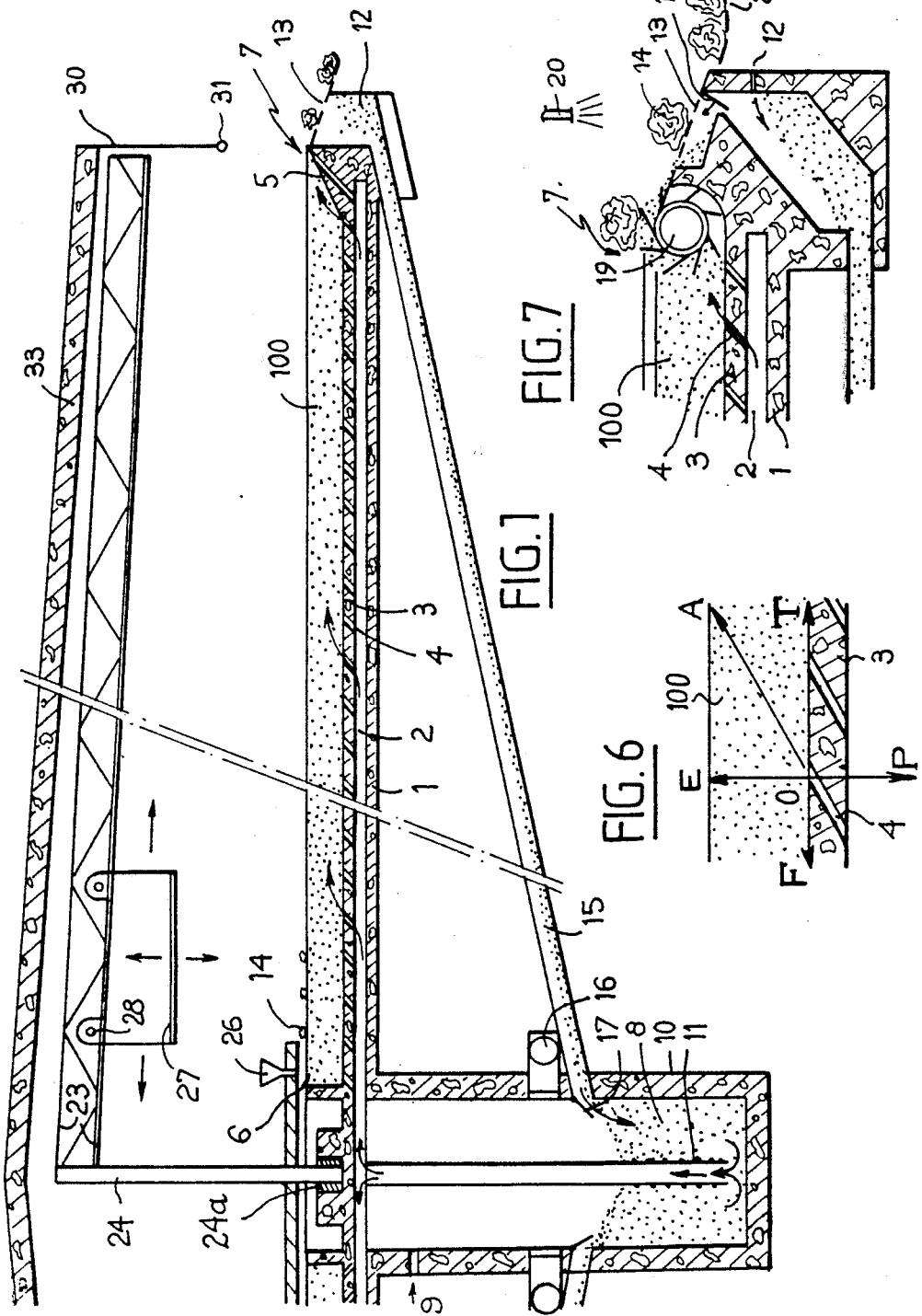
FIG. 1 is a partial cross sectional view of a first embodiment of an installation for growing a group of plants according to the invention.

FIG. 1 shows a container 1 of concrete or other synthetic or natural material which rests on the ground. This container defines a space 2 on the order of 15 to 20 cm in which flow under slight pressure, on the order of 200 to 300 gr/sq cm, granulates 100 impregnated with nutrient solution and adapted to constitute the artificial medium on which grains or young plants 14 are disposed. This space 2 is surmounted by a second slab of concrete 3 forming the bottom of the growing container proper, connected at a plurality of regions to the slab 1 by suitable means (not shown) such as concrets studs, ribs or the like.

This second slab 3 is provided with a multitude of orifices 4 or "nozzles" having a cross section of about 20 to 40 sq mm according to the dimensions employed for this particular embodiment. These nozzles are disposed in a staggered manner through the slab 3 down to the container 1 proper. The orientation of the nozzles relative to the horizontal is a function of the nature of the granulates 100: density, coefficient of friction, roughness, water content, angle of the natural heap.

The thickness of the layer of granulates is about 20 to 30 cm. A sowing or planting zone and a harvesting front 7 are shown.

The granulates 100 are supplied to the nozzles 4. They come from a storage reservoir or silo 8 whose walls 10 permit a pressurization with compressed air 9 at about 2 kg/sq cm.

The granulates 100 are directly discharged by the pressure in the pipe 11 which has a diameter of 20 cm and to the top of which the radiating inlets of the spaces 2 are connected.

The granulates are poured when they arrive at the harvesting front 7 into the space 12 through an inclined sieve 13 which retains the young plants 14 which have reached maturity. A pipe 15 having a section of about 200 sq cm is inclined and connects the space 12 to the silo 8.

A valve 17 is provided for preventing the discharge of the granulates 100 into the conduit 15 when the silo 8 is put under pressure.

A vibrator 16 may moreover facilitate this flow.

Figure 8:
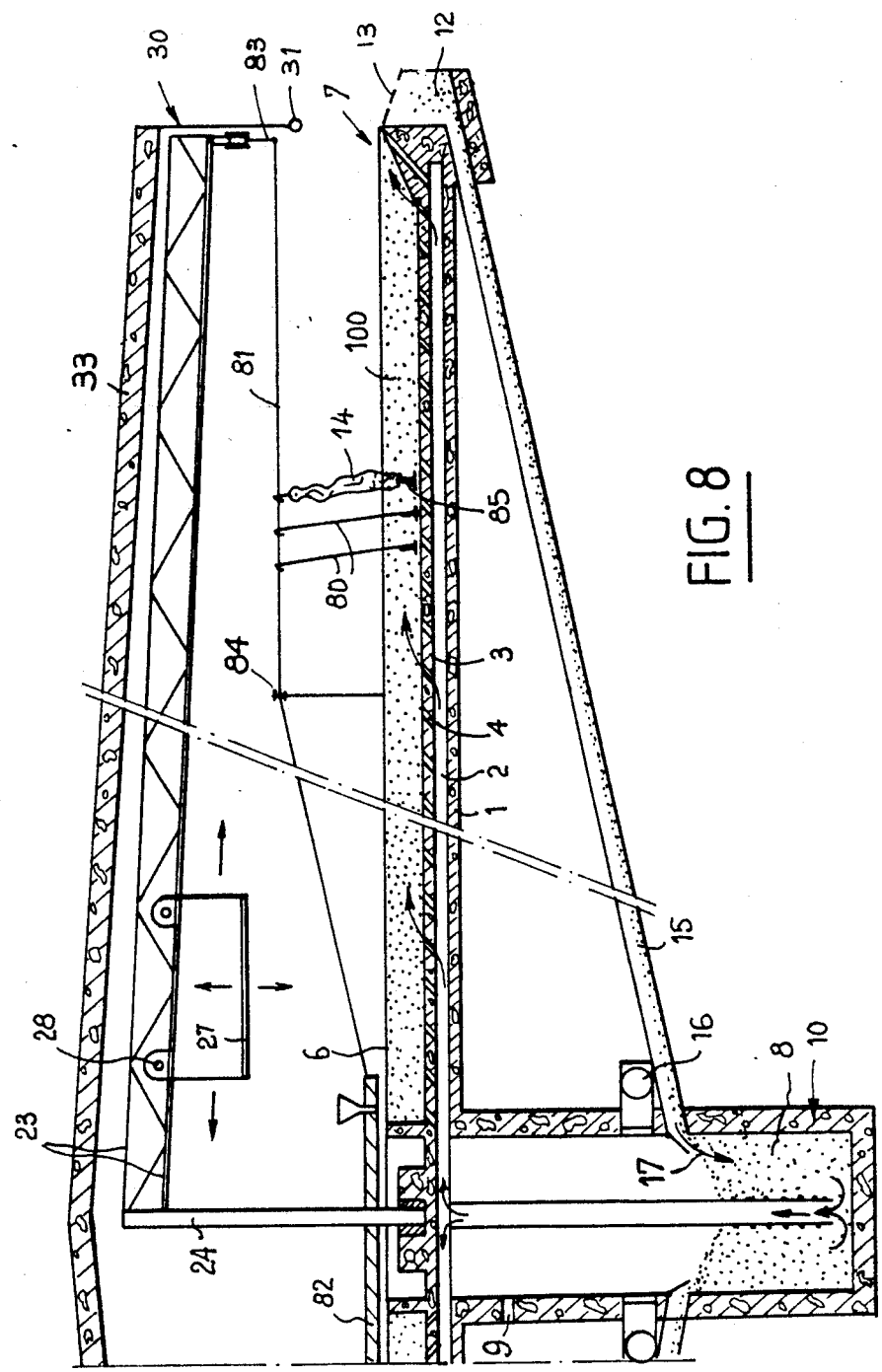
FIG. 8 is a cross sectional view of an installation identical to that of FIG. 1 adapted for the growing of climbing plants.

A gantry 23 is rotatively mounted by a mast 24 in a bearing 24a so as to render this gantry orientable and it is possible to support the end of this gantry on a peripheral guide or runway (as shown at 83 in FIG. 8).

A service car 27 adjustable in height is movably mounted under this gantry by means of rollers 28.

A roof 33 is provided for covering the whole of the container. It is disposed above the installation and held in position by any suitable means. Vertical flaps 30 capable of being raised by rolling around rollers 31 permit a good confinement of the growing medium.

A funnel 26 symbolically represents the planting of the seeds or young plants.

Figure 2:
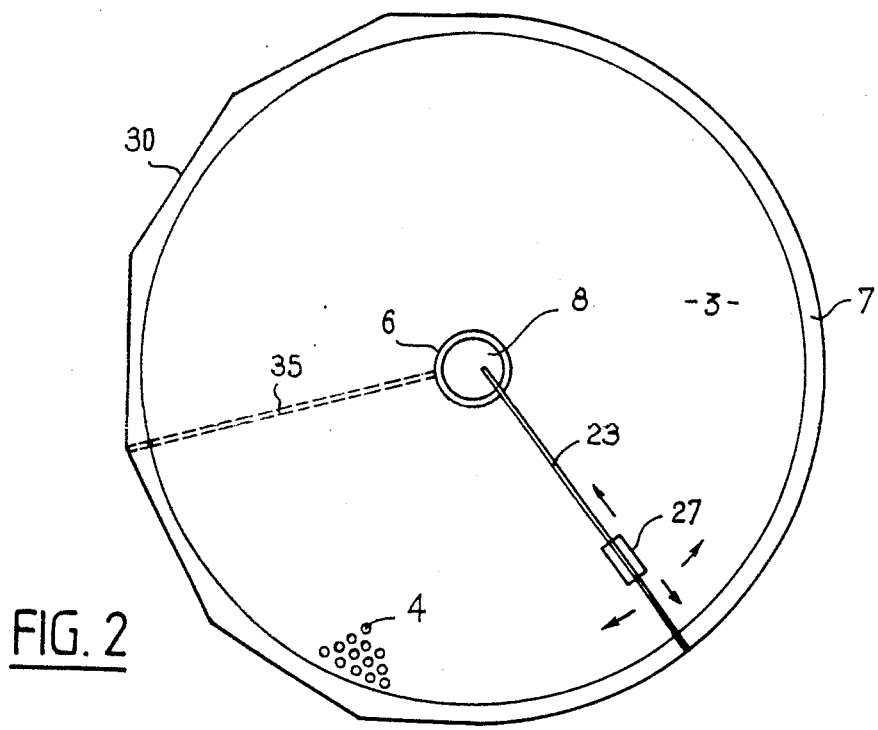
FIG. 2 is a top plan view to a reduced scale of the installation of FIG. 1.

FIG. 2 shows a polygonal container in one half and a circular container in the other half with a separation of the container into compartments or sectors by separators one of which is shown at 35, this separation being of the radiating type. In the case of a single growing, these sector separations become redundant and are eliminated, since the growing conditions would be the same throughout the container.

Figure 3:
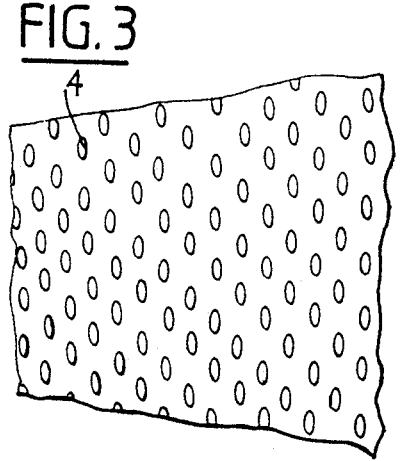
FIG. 3 is a partial top plan view to an enlarged scale of the pipes opening onto the bottom of the container of the installation of FIG. 1.
Figure 4:
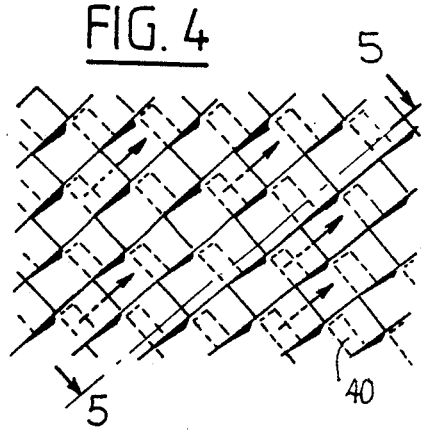
FIG. 4 is a partial top plan view of another arrangement of the pipes.
Figure 5:
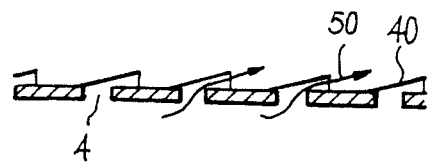
FIG. 5 is a sectional view taken on line 5—5 of FIG. 4.

The nozzles 4 may have different shapes, thus, in FIG. 3, the represented shape is elliptical while, in FIG. 4, the nozzles have been provided with deflecting flaps 40 which are superimposed on the peripheral surface of the aperture so as to orient the flow in a direction close to the surface of the bottom, as indicated by the arrow 50 in FIG. 5 which is a sectional view. The overlapping of the deflectors is also shown.

FIG. 6 represents the forces involved, the weight of the granulates 100, which is proportional to the thickness, is represented by the vector OP, the horizontal translation force represented by the vector OT, the thrust of the granulates issuing from the nozzles 4 represented by the vector OA which is decomposed into OT-OE.

In order to achieve a translation of the granulates it is necessary and sufficient to arrange that OT be greater than the force OF representing the horizontal component of the resultant of the frictional resisting forces of the granulates 100 on the bottom 3 of the container and on the wall 5 of the container. This force is distinctly less than the weight OP.

For a given inclination of the axis of the nozzles 4, the thickness of the granulates 100 increases under the effect of the arrival of the latter from the nozzles 4, the vector OA also increases as does the vector OT which is the force of translation urging the granulates 100 in the forward direction. This increase in the force of translation reduces the thickness. On the other hand, if the thickness decreases, the force of translation in the forward direction also decreases, which increases the thickness.

The system therefore has a self-stabilizing tendency.

Shown in FIG. 7 is the harvesting device of the particular embodiment just described. This device which is not completely shown for reasons of clarity in FIG. 1, may be easily adapted thereto.

The harvesting device comprises a harvesting cylinder having blades 19 which is disposed in the region of the harvesting front 7 and which, in rotating, drives the granulates 100 and the young plants 14 which have reached maturity and pushes them onto the sieve 13, its speed of rotation being determined in accordance with the rate of advance of the granulates 100 at the harvesting front 7.

A fixed or mobile washing system 20 enables the young plants 14 to be cleaned as they are harvested. A conveyor 21 may be provided for discharging the harvest to a treating production line so as to subject it in accordance with its type to the trimming, cutting, conditioning, storage or dispatching operations.

An adaptation of the installation just described to the growing of climbing plants is shown in FIG. 8. Stakes 80 are provided. They slide or roll along threads or guides 81, hooked at one end to a structure 82 and at the other to the runway 83. They are supported by a section member 84 maintained at a good height by vertical posts fixed in position at intervals to the containers 1. The stakes 80 are single or double and may or may not include a roller in their upper part. They are planted in the granulates 100 just in front of the young plants 14 and are or are not tied to the latter. They may be divergent at the base so as to present a large bearing plate 85 which facilitates their translation to the harvesting front 7 at the same time as the young plant.

A variant of the main installation just described concerns the mode of displacement of the plants and the means employed to achieve this.

Figure 9:
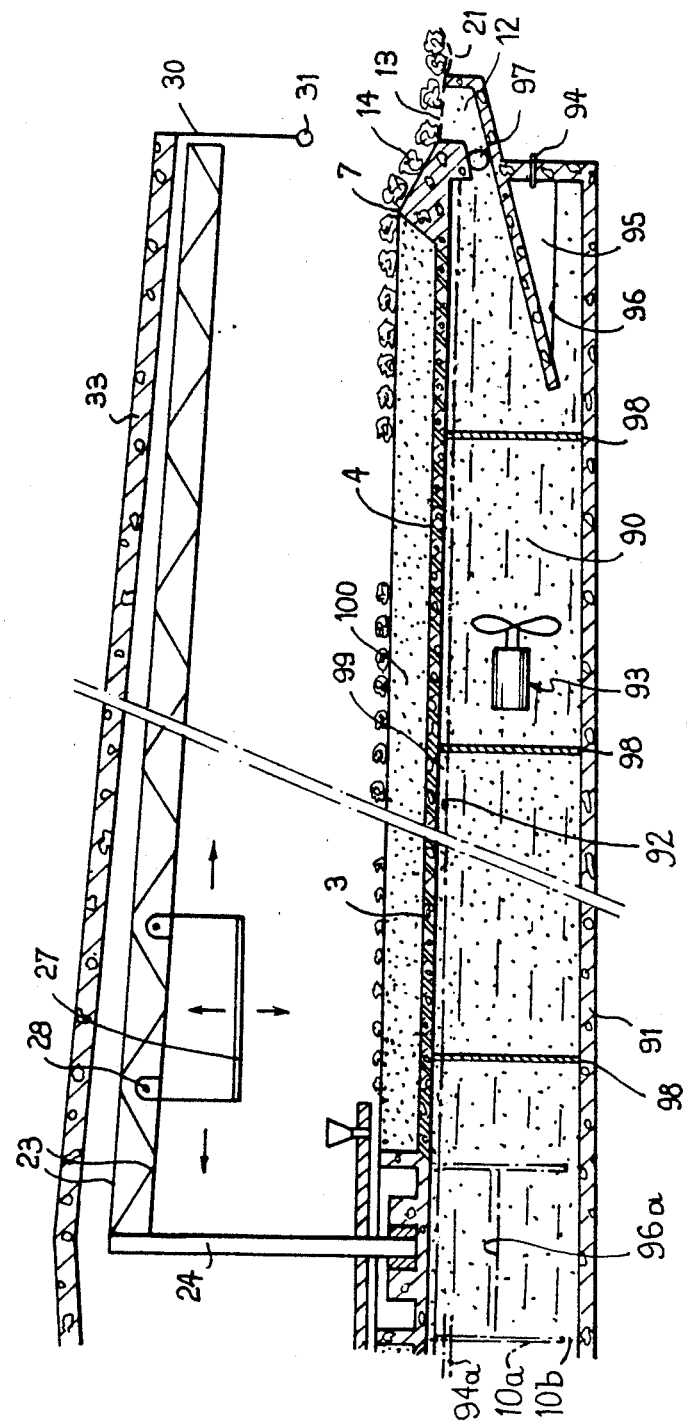
FIG. 9 is a cross sectional view of a second embodiment of an installation for growing a group of young plants according to the invention.

The granulates and the nutrient solution are mixed in a reservoir 90 (FIG. 9) located in the lower part of the installation, the bottom of the container becomes the bottom 91 of the reservoir and the slab 3 becomes the bottom of the growing container proper. The granulates and the nutrient solution contained in the reservoir 90 may be in variable relative concentrations, but 40% of sand for 60% of solution by weight is a representative example.

At rest, the level 92 of the mixture is substantially close to that of the lower side of the slab 3 (see dot-dash line 92). A stirring system 93 puts this mixture into a homogeneous suspension. To modify the level, there is provided an introduction of air compressed at 200-300 gr/sq cm so as to raise the level 92 and urge the granulates/nutrient solution mixture through the nozzles 4 illustrated in FIG. 9. This air inlet has the reference character 94 and is located in such manner that the level of the mixture in the space 95 drops in the working position down to the minimum level 96. Thus the granulates/nutrient solution mixture subjected to the pressure has managed to pass through the nozzles 4, since the fluidtightness of the reservoir has been completed by the closure of the return 97 of the granulates to the reservoir by any suitable means, such as an inflatable seal. Alternatively, the compresses air inlet 94 may be located at 94a in the upper part of a vertical cylinder 10a shown in dot-dash lines in FIG. 9 and defining an outlet space 10b with the bottom wall 91 as shown. This compressed air forces the liquid in the cylinder downwardly to level 96a and has the same result as the device having the inlet 94.

The quantity of granulates injected may be modulated as a function of the section of the nozzles 4, of the relative percentage of the granulates and nutrient solution, of the grain size, of the frequency of pressurization, of the modulation of the durations and intensities of application of this pressure.

The granulates/nutrient solution mixture entrains the young plants without any relative displacement between the young plants and granulates, so that there is no risk of the roots being pulled out or broken. The nutrient solution only saturates the granulates 100 supporting the young plants 14 in the growing container itself during the short periods of the level-raising operations. Between these operations, the solution redescends into the reservoir under the effect of gravity. The granulates do not descend since they are wet and have great cohesion. The roots of the plants are therefore permanently wet.

The connections by means of posts 98 enable the slab 3 to bear against the reservoir bottom 91. They must be small in number in order to avoid disturbing the homogenization.

For the airing of the roots of the plants, above all in the case of the use of granulates having a fine particle size leaving little interstitial gaps therebetween, it is advantageous to maintain the level 92 a little lower than the lower side of the slab 3 at rest, as already mentioned, so as to create a space 99 in which it is possible to blow air which will come to pass through the nozzles 4 and air the substrate of granulates 100.

Figure 10A:
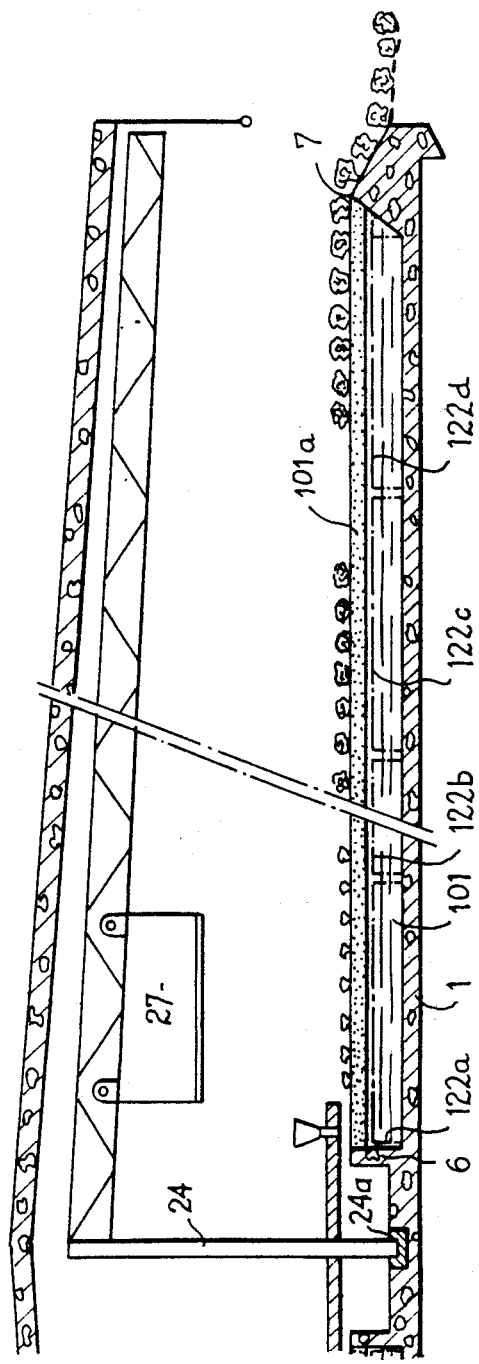
FIG. 10a is a cross sectional view of a third embodiment of an installation for growing young plants which are supported in a floating layer of granulates.
Figure 10:
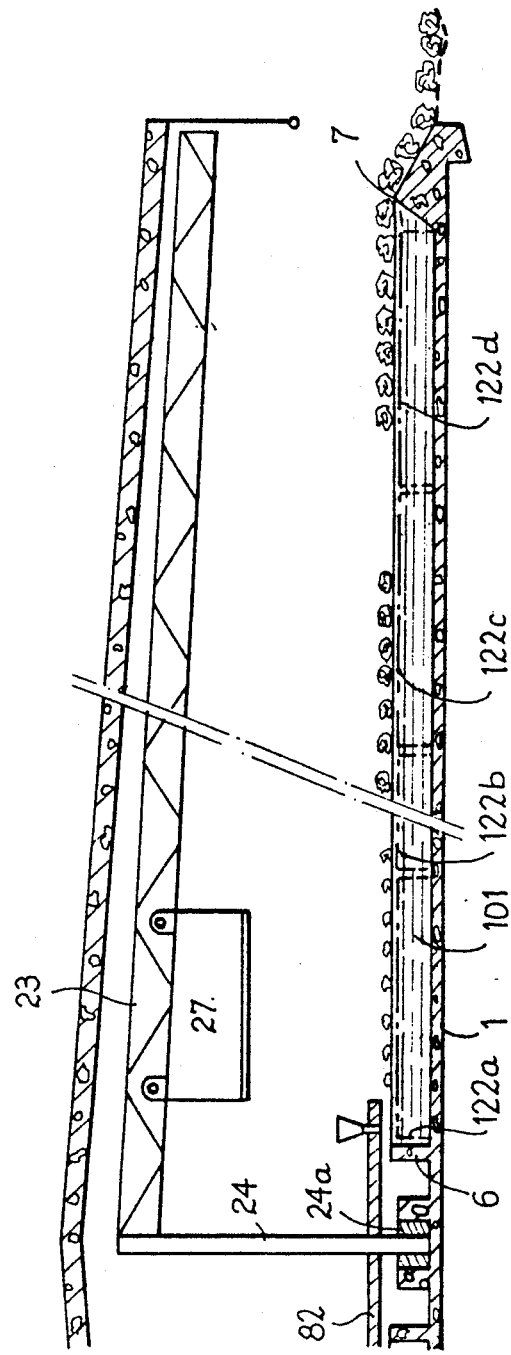
FIG. 10 is a cross sectional view of a fourth embodiment of an installation for growing a group of young plants according to the invention.

The embodiment shown in FIG. 10 is similar in its general outside structure to those previously described except that it now concerns a hydroponic growing, namely a direct growing on the nutrient solution 101 which is contained in a container 1 which is this time completely closed and hermetic.

The means for displacing the artificial medium and the plants is not shown in FIG. 10 but a representation thereof is given in FIGS. 11 to 14.

In FIG. 11, there is shown only the top part of a portion or sector of the container represented in FIG. 10 but to a reduced scale. In the left half of this sector means are shown for supporting the plants which are constituted by pairs of guide threads or wires 111 arranged in radial planes about the centre of the container. FIG. 11a shows an enlargement of these pairs of threads 111 and the position of the plants thereon. The threads or wires of each pair carry the reference numerals 111a and 111b. The pairs of threads 111 are radiating and disposed in a layer. They are held firmly taut between the planting or sowing zone 6 and the harvesting front 7. As shown in FIG. 11a, the wires 111a and 111b of each pair 111 are only slightly divergent, since the roots do not grow as much as the upper part of the plant. Consequently, the spacing between adjacent pairs 111 has a larger divergency to allow for the growth of the upper part of the plants. In the left half of FIG. 11 only the pairs of threads or wires have been shown (as lines) with no other part of the installation lying thereunder for reasons of clarity.

The vertical walls 112, 113 delimit the contours of the container 1. The plants 14 are placed in position in the zone 6 between two threads 111a and 111b of the same pair 111, as represented in FIGS. 11a and 12. The distance between the median axes of two consecutive pairs of threads, in the region of the arrival at the hooking point at the harvesting front 7, is equal to the mean diameter of the plant which as reached maturity and is ready to be harvested, this distance varying in accordance with the cultivated species from a few centimeters to a few decimeters. While the plants are maintained between two threads 111a and 111b of a given pair 111, their roots spread out in the nutrient solution 101 and the part in the air is deployed above the layer of threads. The plants 14 may be in lateral alignment or, better still, in staggered relation as shown in FIG. 11a.

Supports such as 121 are provided at regular radial intervals for preventing the threads from sagging under the weight of these plants (see FIGS. 11, 11a and 12). These supports are arranged to avoid hindering the translation of the plants in that the space between each pair of threads is left clear (see FIG. 12).

Figure 13:
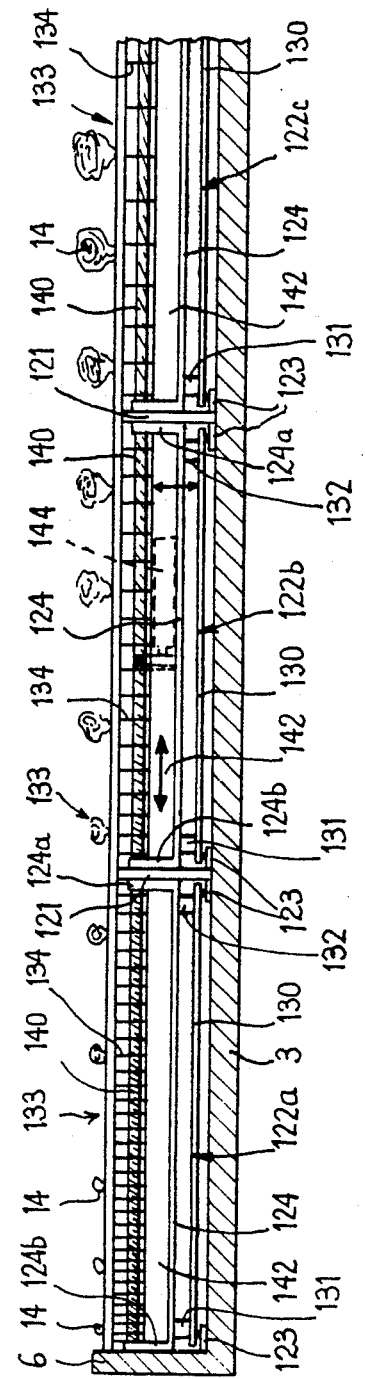
FIG. 13 is a sectional view to an enlarged scale taken on line 13—13 of FIG. 11 showing only one carriage in elevation between two supports for the threads or wires.

As can be seen in the embodiment shown in FIGS. 11 and 13, these supports 121 are arranged on three concentric circles 121a and rest on the bottom of the container 1 so that all the threads 111a, 111b are supported against sagging in the three regions represented by the dot-dash circular lines 121a.

The level of the solution in the container is moreover maintained constant by an intake and draining system suitably chosen from existing systems so that the roots of the plants reach this solution.

In the right part of FIG. 11, the pairs of threads 111 are not shown in order to provide a better view of a thrusting system which advances or feeds the young plants along the pairs of threads and in so doing controls the transverse and longitudinal spacing between these plants. This thrusting system is schematically represented by four radially outwardly divergent substantially quadrilateral autonomous units 122a, 122b, 122c, 122d which together occupy a sector of the circular container 1, apart from small clearances therebetween, since each divergent unit is separated from the radially adjacent unit by the circular rows of supports 121, as shown.

Figure 14:
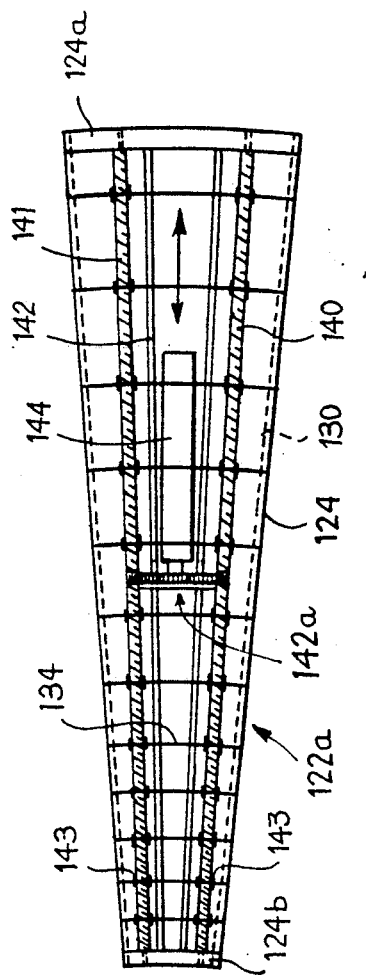
FIG. 14 is a top plan view of one mobile carriage employed in the fourth embodiment and located between two supports for the threads or wires.

FIG. 14 is an enlarged plan view of unit 122a which is similar to the other three units apart from the circumferential width of these units which of course varies from one unit to the other. Each autonomous unit 122 comprises a radially outwardly divergent carriage 124 which is rollingly supported on circular rails or guides 123 for movement in either direction about the centre of the container.

These four carriages may therefore travel together over the entire area of the container 1 by rolling along the circular rails or guides 123 also partly shown in FIG. 11. The number of units 122a to 122d given by way of example is four, but this number will have to be adapted to the type and size of the container 1. Likewise, if the angular sector is radially short, the number of units 122 bay be reduced to one, which simplifies the installation.

FIG. 13 is a sectional view in a radial plane showing the detail of the unit 122b which comprises a chassis 130 capable of rolling along the rails 123. This unit includes a thrusting structure 133 which includes the carriage 124 which may be raised or lowered relative to the chassis by a group of electrical jacks 131, 132. These jacks may also be hydraulic or pneumatic and are mounted between the chassis and this structure. The height of the adjustment substantially corresponds to the height of the deepest roots for the considered section or unit.

This structure 133 is formed by a large number of movable curved blades 134 (the radius of curvature being centered on the centre of the container) whose spacing is progressively variable for a given unit 122 the function of which is to push on the plants and to space them apart from one another. The blades 134 have been schematically represented in FIG. 11 only partly for reasons of clarity of the drawings. In fact each unit 122a to 122d has blades from one end thereof to the other as shown in FIG. 14 as concerns unit 122a although here again only a small number of blades 134 have been shown in order to simplify the drawings. The blades are interconnected by lead-screws 140, 141 the thread pitch of which progressively increases from the centre part of the container to the outer periphery, these screws being prevented from moving in translation relative to the chassis for example by end supports 124a, 124b in which the screws are rotatively mounted (see FIG. 14).

The blades slide along a support 142 such as rails and lugs 143 connected to each blade are engaged with the respective screws 140, 141 so as to be advanced at a rate depending on the pitch of the threads of the screws. A motor 144 mounted on the carriage 124 drives the screws 140, 141 through a set of gears 142a.

Each autonomous unit 122a to 122d operates in the following manner:

The lead-screws are rotated by the motor 144 and the blades slide through distances which increase as one moves away from the centre of the container. There is therefore an overall translation and a relative displacement of the blades which, when combined with the progressively increasing spacing between the pairs of threads 111, results in a general translation and in a lateral and longitudinal moving apart of the plants.

Prior to this blade shifting operation lowering the thrusting structure 133 is raised with respect to the chassis by means of the jacks 132 so that the upper edge of the blades 134 comes in contact with the pairs of threads 111 and plant roots extending downwardly through the pairs of threads 111.

At the end of the operation, the structure 133 is lowered to a position below the roots of the plants and the direction of rotation of the motor 144 is reversed and the blades 134 are returned to their initial positions.

In the case of a circular container 1, the autonomous units 122a to 122d are then moved along the rails 123 until they are positioned in a new sector of the container and all of the preceding steps are repeated for this sector for radially outwardly displacing the plants and so on for the whole of the container. Note that in the case of a plurality of radial partitions such a partition 35 of FIG. 2 for the arrangement of a plurality of sectors in which different growing conditions prevail, the units 122a to 122d would be displaced on the rails 123 between end positions defined by these partitions 35 in each sector.

Furthermore, a variant consists in replacing the blades 134 by points or rods of small section, above all in the regions adjacent to the central part of the container where there is a small distance between two successive rows of young plants.

Indeed, in some cases, it could happen that the solid and continuous blades have difficulty in being inserted between the roots of the plants of two consecutive rows and cause the raising of the young plants themselves, which would have an adverse effect on the operation of the installation.

According to the invention, another variant (not shown) consists in stacking containers one on top of another with a possible regrouping of the associated mechanical means, thereby producing growing towers.

Figure 15:
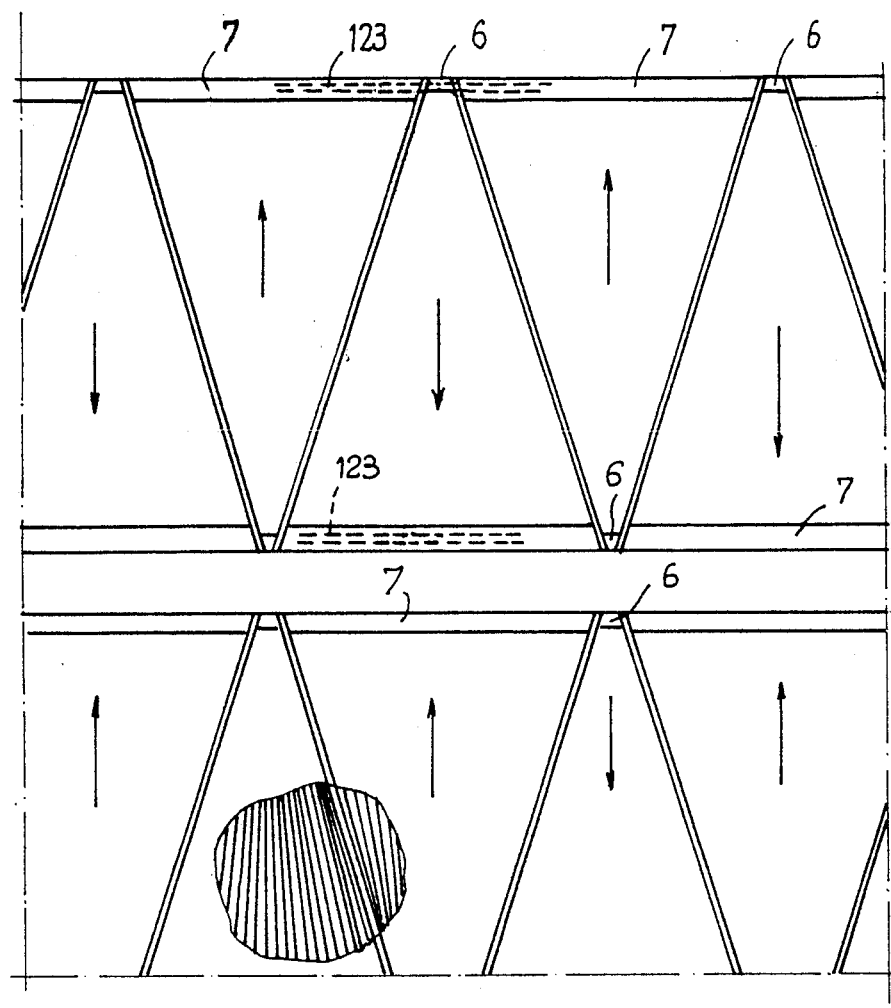
FIG. 15 is a view of a variant of the container which is rectilinear and divided into side-by-side reversed triangular compartments.

Other types of installations may be envisaged as to the outer form of the containers and their arrangements. Thus, in FIG. 15, a rectilinear arrangement has been shown of the containers which have triangular shapes somewhat similar to the sectors of the circular container of FIGS. 2, 10 or 14, and are disposed in alternately inverted relation.

Another embodiment according to the invention consists in the use of such a proportion of granulates that, by means of a lower density thereof with respect to the nutrient solution, they are made to float on the solution and thus support the plants instead of the pairs of threads 111. The mechanical thrusting means for displacing the plants are similar to those envisaged for the hydroponic growing shown in FIGS. 11, 13 and 14.

In such an embodiment, the supporting of the plants is therefore effected by the granulates themselves while optional pairs of threads 111 only perform, when they exist, an accessory and complementary guiding function. FIG. 10a illustrates this embodiment in which the container 1 and associated parts are similar to those shown in FIG. 10. The nutrient solution 101 is contained in the container as before, but instead of pairs of threads 111 for supporting the plants, there is employed a floating layer of granulates 101a in which the plants are embedded. Depicted schematically in dot-dash lines are the autonomous units 122a, 122b, 122c, 122d located in the bottom of the container below the roots of the plants and the lower surface of the floating layer 101a of granulates. These units operate in the same way as those of FIGS. 11, 13 and 14 in exerting a thrust on the roots of the plants in the radially outward direction.

What is claimed is:

1. A process for an automated growing of non-potted plant objects in an artificial medium, said process comprising providing a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, providing said medium in the form comprising a nutrient solution and support members selected from the group consisting of granulates, and pairs of threads or wires held taut between the first edge and the second edge of the container and spaced apart a distance suitable for holding each plant object therebetween as the plant object travels from the first edge to the second edge of the container, median axes of the pairs of threads or wires being arranged in radiating planes divergent from the first edge to the second edge, disposing said medium in the container, with the support members occupying at least an upper part of the medium and being in supported relation to the container, collectively planting bare plant objects selected from the group consisting of seeds and young plants directly in said support members adjacent to said first edge of the container substantially as close together as possible, periodically exerting thrusts on the plant objects supported on said support members in directions from said first edge toward said second edge so as to periodically displace the plant objects relative to the container in said directions substantially in accordance with the rate of growth of the plant objects so that suitable grown plant objects finally reach said second edge in supported relation to said support members at a substantially correct spacing from one another for the size of the plant objects at said second edge, said increasing extent of the container making available to the plant objects an increasing space in the container which allows an increasing spacing between the plant objects transversely of said directions of thrust as the plant objects travel from said first edge to said second edge, and removing the suitably grown plant objects from said container at said second edge.

2. A process for an automated growing of non-potted plant objects in an artificial medium, said process comprising providing a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, providing said medium in the form of nutrient solution and granulates and placing said medium in the container so as to cover the whole of the area of the bottom wall of the container and be supported by the container, collectively planting bare plant objects selected from the group consisting of seeds and young plants directly in said granulates adjacent to said first edge of the container substantially as close together as possible, periodically exerting thrusts on the granulates and plant objects in directions from said first edge toward said second edge by means of further amounts of said medium urged under pressure through nozzles which are provided in said bottom wall and are upwardly inclined in a direction toward said second edge and arranged in substantially equispaced relation to one another throughout the area of said bottom wall so as to periodically displace the granulates in the container toward said second edge and cause a spreading of the granulates over said bottom wall and thereby displace the plant objects toward said second edge while spreading the plant objects apart from one another in directions toward said second edge and in transverse directions owing to an effect of said gradually increasing extent of the container substantially in accordance with the rate of growth of the plant objects so that suitably grown plant objects finally reach said second edge in supported relation to said granulates at a substantially correct spacing from one another for the size of the plant objects at said second edge, and removing the plant objects from the container at said second edge which constitutes an overflow, said process further comprising supplying said further amounts of said medium from a silo of said medium by supplying gas under pressure to the interior of the silo and thereby discharging said medium from the silo to said nozzles through a chamber defined by said bottom wall and by a lower wall space from said bottom wall, said chamber extending substantially throughout the area of the bottom wall of the container and being connected to the silo by supply pipe means, said process further comprising receiving said medium overflowing from said second edge in a space located below said second edge and extending alongside the entire extent of said second edge, discharge pipe means connecting said space to the reservoir for returning said overflowing medium to said silo, said process further comprising closing said discharge pipe means when putting said silo under pressure.

3. A process for an automated growing of non-potted plant objects in a artificial medium, said process comprising providing a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, providing said medium in the form of nutrient solution and granulates and placing said medium in the container so as to cover the whole of the area of the bottom wall of the container and be supported by the container, collectively planting bare plant objects selected from the group consisting of seeds and young plants directly in said granulates adjacent to said first edge of the container substantially as close together as possible, periodically exerting thrusts on the granulates and plant objects in directions from said first edge toward said second edge by means of further amounts of said medium urged under pressure through nozzles which are provided in said bottom wall and are upwardly inclined in a direction toward said second edge an arranged in substantially equispaced relation to one another throughout the area of said bottom wall so as to periodically displace the granulates in the container toward said second edge and cause a spreading of the granulates over said bottom wall and thereby displace the plant objects toward said second edge while spreading the plant objects apart from one another in directions toward said second edge and in transverse directions owing to an effect of said gradually increasing extent of the container substantially in accordance with the rate of growth of the plant objects so that suitably grown plant objects finally reach said second edge in supported relation to said granulates at a substantially correct spacing from one another for the size of the plant objects at said second edge, and removing the plant objects from the container at said second edge which constitutes an overflow, said process further comprising supplying said further amounts of said medium from a reservoir of said medium which is disposed directly below said bottom wall and extends throughout the area of said bottom wall so that said medium can directly enter said nozzles from said reservoir, said medium comprising granulates in suspension in said nutrient solution in the reservoir, said process further comprising stirring said suspension before supplying the medium to the container through the nozzles by applying a pressure on the medium in the reservoir by supplying gas under pressure to a part of the reservoir to cause the level of the medium to rise in the reservoir and enter the container, and then allowing the level of the medium in the reservoir to drop to below said bottom wall, and returning the medium overflowing at said second edge to the reservoir through passage means, but closing said passage means when putting the reservoir under pressure.

4. A process for an automated growing of non-potted plant objects in an artificial medium, said process comprising providing a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, providing said medium in the form of a nutrient solution and granulates having such density as to be floatable on the nutrient solution, and placing said medium in the container so as to cover the whole of the area of the bottom wall of the container and be supported by the container with the granulates floating in the form of a layer on said nutrient solution, collectively planting bare plant objects selected from the group consisting of seeds and young plants directly in said granulates adjacent to said first edge of the container substantially as close together as possible, periodically mechanically shifting the plant objects in directions from said first edge toward said second edge by means of movable mechanical thrust elements which are located in the container under said layer of floatable granulates and are spaced apart from one another between said first edge and said second edge at pitches which gradually increase in a direction from said first edge to said second edge substantially in accordance with an increase in the overall size of the plant objects as they grow in travelling from said first edge to said second edge, said shifting being effected by bringing the thrust elements in contact with the underside of siad layer of granulates and causing said thrust elements to exert a thrust on the granulates and plant objects in directions from said first edge toward said second edge which displaces the respective plant objects through a distances substantially equal to said pitches between respective neighboring thrust elements, said increasing extent of the container making available to the plant objects an increasing space in the container which allows an increasing spacing between the plant objects transversely of said directions of thrust as the plant objects travel from said first edge to said second edge, and removing the suitably grown plant objects from said container at said second edge.

5. A process for an automated growing of non-potted plant objects in an artificial medium, said process comprising providing a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, providing said medium in the form of a nutrient solution and pairs of threads or wires held taut between said first edge and said second edge and located above the nutrient solution in the container, and spaced apart a distance suitable for holding each plant object therebetween as the plant object travels from said first edge to said second edge, median axes of the pairs of threads or wires being arranged in radiating planes divergent from said first edge to said second edge, said median axes being placed close together at said first edge to enable said plant objects to be placed substantially as close together as possible and spaced sufficient distances apart at said second edge to allow sufficient spacing between the suitably grown plant objects when they reach said second edge, collectively planting bare plant objects selected from the group consisting of seeds and young plants directly in respective pairs of threads or wires, periodically mechanically shifting the plant objects along and within said pairs of threads or wires from said first edge to said second edge by means of movable mechanical thrust elements which are located in the container under the threads or wires and spaced apart from one another between said first edge and said second edge at pitches which gradually increase in a direction from said first edge to said second edge substantially in accordance with an increase in the overall size of the plant objects as they grow in travelling from said first edge to said second edge, said shifting being effected by bringing the thrust elements in contact with the plant objects and causing the thrust elements to travel through distances substantially equal to said pitches between respective neighboring thrust elements, and removing the suitably grown plant objects from said container at said second edge.

6. A process according to claim 5, wherein said artificial medium further comprises a layer of floatable granulates floating on said nutrient solution and said process comprises planting said plant objects also in said layer of floatable granulates.

7. A process according to claim 1, wherein said container is substantially annular in shape, and said first edge and said second edge are substantially circular.

8. A process according to claim 2, wherein said container is substantially annular in shape, and said first edge and said second edge are substantially circular.

9. A process according to claim 3, wherein said container is substantially annular in shape, and said first edge and said second edge are substantially circular.

10. A process according to claim 4, wherein said container is substantially annular in shape, and said first edge and said second edge are substantially circular.

11. A process according to claim 5, wherein said container is substantially annular in shape, and said first edge and said second edge are substantially circular.

12. A process according to claim 1, wherein the container is substantially annular in shape, the process comprising employing only a sector of the container by providing radial partitions between said first and second edges.

13. A process according to claim 4, wherein said thrust elements are part of a unit which is supported on rails provided on said bottom wall of the container and are substantially parallel to said first edge and second edge, said process comprising exerting said thrusts on said granulates and plant objects in a plurality of stages by shifting said unit laterally along said rails after having caused said thrust elements to exert said thrusts whereby to act on all of the plant objects in the container when the lateral extent of the thrust elements in less than the total lateral extent of the container.

14. A process according to claim 5, wherein said thrust elements are part of a unit which is supported on rails provided on said bottom wall of the container and are substantially parallel to said first edge and second edge, said process comprising exerting said thrusts on said granulates and plant objects in a plurality of stages by shifting said unit laterally along said rails after having caused said thrust elements to exert said thrusts whereby to act on all of the plant objects in the container when the lateral extent of the thrust elements in less than the total lateral extent of the container.

15. A process according to claim 6, wherein said thrust elements are part of a unit which is supported on rails provided on said bottom wall of the container and are substantially parallel to said first edge and second edge, said process comprising exerting said thrusts on said granulates and plant objects in a plurality of stages by shifting said unit laterally along said rails after having caused said thrust elements to exert said thrusts whereby to act on all of the plant objects in the container when the lateral extent of the thrust elements is less than the total lateral extent of the container.

16. A process according to claim 13, wherein said container is substantially annular in shape, and said first edge and said second edge are substantially circular and said rails are circular, said process comprising shifting said unit along the circular rails for effecting said stages.

17. A process according to claim 14, wherein said container is substantially annular in shape, and said first edge and said second edge are substantially circular and said rails are circular, said process comprising shifting said unit along he circular rails for effecting said stages.

18. A process according to claim 15, wherein said container is substantially annular in shape, and said first edge and said second edge are substantially circular and said rails are circular, said process comprising shifting said unit along the circular rails for effecting said stages.

19. A process according to claim 4, wherein said thrust elements are part of a unit comprising a carriage and said thrust elements are upwardly movably mounted on said carriage, said process comprising periodically raising said thrust elements to an operative position of contact with said granulates, exerting said thrusts with the thrust elements and thereafter lowering the thrust elements to an inoperative position relative to the carriage ready for a further thrust cycle of the thrust elements.

20. A process according to claim 5, wherein said thrust elements are part of a unit comprising a carriage and said thrust elements are upwardly movably mounted on said carriage, said process comprising periodically raising said thrust elements to an operative position of contact with said granulates, exerting said thrusts with the thrust elements and thereafter lowering the thrust elements to an inoperative position relative to the carriage ready for a further thrust cycle of the thrust elements.

21. A process according to claim 6, wherein said thrust elements are part of a unit comprising a carriage and said thrust elements are upwardly movably mounted on said carriage, said process comprising periodically raising said thrust elements to an operative position of contact with said granulates, exerting said thrusts with the thrust elements and thereafter lowering the thrust elements to an inoperative position relative to the carriage ready for a further thrust cycle of the thrust elements.

22. A process according to claim 1, comprising selecting said granulates in accordance with desired densities and intrinsic characteristics from the group consisting of sand, gravel, expanded glass balls, expanded clay, pouzzolane, vermiculite, perlite and cork.

23. A process according to claim 1, comprising employing stakes movably mounted on a support extending from said first edge to said second edge and fastening the plant objects to the stakes for supporting the growing plant objects in the displacement thereof toward said second edge.

24. A process according to claim 1, comprising collecting the suitably grown plant objects at said second edge by separating the plant objects from said support members with mechanical harvesting means.

25. A process according to claim 24, comprising placing the harvested plant objects on a conveyor for conveying to a treating line.

26. A process according to claim 1, wherein said container is trapezoidal in plan and said process comprises dividing the container into trapezoidal regions in side-by-side relation and in alternately reversed orientations so that the container has one wall defining alternately said first edge and said second edge and an opposite wall defining said second edge and said first edge, respectively.

27. An installation for the automated growing of plant objects selected from the group consisting of seeds and young plants in an artificial medium, comprising a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, said medium being disposed in the container and occupying the whole area of the container and comprising a nutrient solution, and support members selected from the group consisting of granulates and pairs of threads or wires held taut between the first edge and the second edge of the container and spaced apart a distance suitable for holding each plant object therebetween as the plant object travels from the first edge to the second edge of the container, median axes of the pairs of threads or wires being arranged in radiating planes divergent from the first edge to the second edge, the support members occupying at least an upper part of the medium and being in supported relation to the container, means for periodically exerting thrusts on the plant objects supported on said support members in directions from said first edge toward said second edge so as to displace the plant objects relative to the container in said directions substantially in accordance with the rate of growth of the plant objects so that suitably grown plant objects finally reach said second edge in supported relation to said support members at a substantially correct spacing from one another for the size of the plant objects at said second edge, said increasing extent of the container making available to the plant objects an increasing space in the container which allows an increasing spacing between the plant objects transversely of said directions of thrust as the plant objects travel from said first edge to said second edge.

28. An installation for the automated growing of plant objects selected from the group consisting of seeds and young plants in an artificial medium, comprising a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, said medium being disposed in the container and occupying the whole area of the container and comprising a nutrient solution and granulates, a multitude of upwardly inclined nozzles provided in said bottom wall throughout the area of the bottom wall, the upward inclination being in a direction from said first edge toward said second edge, a lower wall defining with said bottom wall chamber located under said bottom wall and extending substantially throughout said bottom wall, a silo for said medium, supply pipe means connecting the silo to the chamber, means defining a space extending alongside said second edge, said second edge constituting an overflow edge and said space being located below said overflow edge for receiving said medium overflowing from said overflow edge, means for separating the grown plant objects from the medium at said overflow edge, return pipe means connecting said space to said silo for returning the overflowed medium to said silo, a compressed gas supply pipe communicating with the silo for periodically putting the interior of the silo under pressure and urging the medium out of the silo and through said supply pipe means into the chamber and thence through the nozzles and thereby urging the medium and the plant objects located within the chamber toward said second edge, and means for closing the return pipe means during said pressurizing of the interior of the silo.

29. An installation for the automated growing of plant objects selected from the group consisting of seeds and young plants in an artificial medium, comprising a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, said medium being disposed in the container and occupying the whole area of the container and comprising a nutrient solution and granulates, a multitude of upwardly inclined nozzles provided in said bottom wall throughout the area of the bottom wall, the upward inclination being in the direction from said first edge toward said second edge, wall means defining with said bottom wall a reservoir for said medium comprising said granulates and nutrient solution, means within the reservoir for periodically maintaining a suspension of the granulates in the nutrient solution, said nutrient solution and granulates being disposed in a layer in the container throughout the area of said bottom wall, means defining a space extending alongside said second edge, said second edge constituting an overflow edge and said space being located below said overflow edge for receiving said medium overflowing from said overflow edge, means for separating the grown plant objects from the medium at said overflow edge, return pipe means connecting said space to said reservoir for returning the medium which has overflowed over said second edge to the reservoir, means for periodically closing said return pipe means and rendering the interior of the reservoir fluidtight, compressed gas supply pipe means communicating with the interior of the reservoir for periodically raising the level of the granulates and nutrient solution in the reservoir so as to cause the granulates and nutrient solution to pass through the nozzles and thereby displace the granulates and nutrient solution and plant objects in said container toward said second edge and increase the spacing between the plant objects.

30. A installation for the automated growing of plant objects selected from the group consisting of seeds and young plants in an artificial medium, comprising a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, said medium being disposed in the container and occupying the whole area of the container and comprising a nutrient solution and granulates having such density as to be floatable in a layer on the nutrient solution said nutrient solution and layer of granulates occupying the whole of the area of the container, movable mechanical thrust elements located in the container below the layer of granulates and spaced apart from one another between said first edge and said second edge at pitches which gradually increase in a direction from said first edge to said second edge substantially in accordance with an increase in the overall size of the plant objects as they grow in travelling from said first edge to said second edge, means for periodically bringing the thrust elements in contact with a lower part of the layer of floating granulates and causing the thrust elements to exert a thrust on the granulates and plant objects in directions from said first edge toward said second edge and thereby displacing the respective plant objects through distances substantially equal to said pitches between respective neighboring thrust elements.

31. An installation for the automated growing of plant objects selected from the group consisting of seeds and young plants in an artificial medium, comprising a container of such configuration as to comprise a bottom wall, a first upwardly-extending wall defining a first edge, a second upwardly-extending wall defining a second edge in spaced relation to and substantially parallel to said first edge, said second edge having an extent larger than the extent of said first edge, and the container having a progressively increasing extent in directions parallel to said edges from said first edge to said second edge, said medium being disposed in the container and occupying the whole area of the container and comprising a nutrient solution and pairs of threads or wires held taut between said first edge and said second edge and located above the nutrient solution in the container and spaced apart a distance suitable for holding each plant object therebetween as the growing plant object travels from said first edge to said second edge, median axes of the pairs of threads or wires being arranged in radiating planes divergent from said first edge to said second edge, said median axes being placed sufficiently close together at said first edge to enable said plant objects to be placed substantially as close together as possible and spaced a sufficient distance apart at said second edge to allow sufficient spacing between the suitably grown plant objects when they reach said second edge, movable mechanical thrust elements located in the container below the layer of granulates and spaced apart from one another between said first edge and said second edge at pitches which gradually increase in a direction from said first edge to said second edge substantially in accordance with an increase in the overall size of the plant objects as they grown in travelling from said first edge to said second edge, means for periodically bringing the thrust elements in contact with roots of the plant objects and causing the thrust elements to exert a thrust on the plant objects in directions from said first edge toward said second edge and thereby displace the respective plant objects through distances substantially equal to said pitches between respective neighboring thrust elements.

32. An installation according to claim 31, further comprising a layer of granulates having such density as to be floatable on the nutrient solution in the container for supporting the plant objects in addition to the pairs of threads or wires.

33. An installation according to claim 27, wherein the container is substantially annular in shape and said first edge and said second edge are substantially circular peripheries of the annular shape.

34. An installation according to claim 28, wherein the container is substantially annular in shape and said first edge and said second edge are substantially circular peripheries of the annular shape.

35. An installation according to claim 29, wherein the container is substantially annular in shape and said first edge and said second edge are substantially circular peripheries of the annular shape.

36. An installation according to claim 30, wherein the container is substantially annular in shape and said first edge and said second edge are substantially circular peripheries of the annular shape.

37. An installation according to claim 31, wherein the container is substantially annular in shape and said first edge and said second edge are substantially circular peripheries of the annular shape.

38. An installation according to claim 27, wherein the container is substantially annular in shape and said first edge and said second edge are substantially circular peripheries of the annular shaped container and radially extending partitions extend from said first edge to said second edge for dividing the interior of the container into sectors for receiving different plant objects.

39. An installation according to claim 28, further comprising a vibrator associated with said silo.

40. An installation according to claim 27, further comprising adjacent said second edge a harvesting device including a rotary bladed harvesting roll for removing the grown plant objects from said second edge.

41. An installation according to claim 27, comprising a washing system placed above said second edge for washing the grown plant objects as they leave said second edge.

42. An installation according to claim 30, wherein said thrust elements are part of an autonomous unit extending substantially from said first edge to said second edge of the container and comprising a carriage, a support located above the carriage and defining guide means, means for raising and lowering the support relative to the carriage, said thrust elements slidably bearing against the guide means of the support, lead-screw means mounted on the support to be rotative and axially stationary relative to the support, lugs connected to the thrust elements and mounted on and engaged with the lead-screw means so as to be movable in translation along the lead-screw means upon rotation of the lead-screw means, the lead-screw means having a screw pitch which increases from an end of the autonomous unit adjacent to said first edge to an opposite end of the unit adjacent to said second edge in accordance with the known rate of growth of the plant objects as they travel from said first edge to said second edge, the thrust elements being arranged spaced apart along the lead-screw means in accordance with an increasing pitch which is substantially the same as the increasing pitch of the lead-screw means, whereby rotation of the lead-screw means causes the thrust elements to be displaced toward said second edge by distances corresponding to the respective pitch of the thrust elements and the respective pitch of the lead-screw, an electric motor mounted on the support and drivingly engaged with the lead-screw means for shifting the thrust elements toward said second edge through said lead-screw means and said lugs.

43. An installation according to claim 31, wherein said thrust elements are part of an autonomous unit extending substantially from said first edge to said second edge of the container and comprising a carriage, a support located above the carriage and defining guide means, means for raising and lowering the support relative to the carriage, said thrust elements slidably bearing against the guide means of the support, lead-screw means mounted on the support to be rotative and axially stationary relative to the support, lugs connected to the thrust elements and mounted on and engaged with the lead-screw means so as to be movable in translation along the lead-screw means upon rotation of the lead-screw means, the lead-screw means having a screw pitch which increases from an end of the autonomous unit adjacent to said first edge to an opposite end of the unit adjacent to said second edge in accordance with the known rate of growth of the plant objects as they travel from said first edge to said second edge, the thrust elements being arranged spaced apart along the lead-screw means in accordance with an increasing pitch which is substantially the same as the increasing pitch of the lead-screw means, whereby rotation of the lead-screw means causes the thrust elements to be displaced toward said second edge by distances corresponding to the respective pitch of the thrust elements and the respective pitch of the lead-screw, an electric motor mounted on the support and drivingly engaged with the lead-screw means for shifting the thrust elements toward said second edge through said lead-screw means and said lugs.

44. An installation according to claim 31, comprising support means mounted on the container and in alignment with one another along lines parallel to said first and second edges and combined with the pairs of threads or wires for supporting the threads or wires against sagging in regions intermediate said first edge and said second edge, said support means allowing an uninterrupted passage for the plant objects between the paris of threads or wires, said thrust elements being part of aligned autonomous units interposed between said support means and between said support means and said first edge and said second edge, the aligned units together extending substantially from said first edge to said second edge but being separated from each other in order to clear said lines of support means for the pairs of threads or wires, each unit comprising a carriage, a support located above the carriage and defining guide means, means for raising and lowering the support relative to the carriage, respective thrust elements slidably bearing against the guide means of the support, lead-screw means mounted on the support to be rotative and axially stationary relative to the support, lugs connected to the thrust elements and mounted on and engaged with the lead-screw means so as to be movable in translation along the lead-screw means upon rotation of the lead-screw means, the lead-screw means having a screw pitch with increases from an end of the autonomous unit adjacent to said first edge to an opposite end of the unit adjacent to said second edge in accordance with the known rate of growth of the plant objects as they travel from said first edge to said second edge, the thrust elements being arranged spaced apart along the lead-screw means in accordance with an increasing pitch which is substantially the same as the increasing pitch of the lead-screw means, whereby rotation of the lead-screw means causes the thrust elements to be displaced toward said second edge distances corresponding to the respective pitch of the thrust elements and the respective pitch of the lead-screw, an electric motor mounted on the support and drivingly engaged with the lead-screw means for shifting the thrust elements toward said second edge through said lead-screw means and said lugs, said pitches relating to each unit being such that together they increase progressively from adjacent to said first edge to adjacent to said second edge of the container substantially in accordance with the known rate of growth of the plant objects as they travel from said first edge to said second edge of the container.

45. An installation according to claim 30, wherein said thrust elements are part of at least one autonomous unit movably mounted on rails provided on said bottom wall of the container for moving to and operating in different parts of the container, said rails being parallel to said second edge.

46. An installation according to claim 31, wherein said thrust elements are part of at least one autonomous unit movably mounted on rails provided on said bottom wall of the container for moving to and operating in different parts of the container, said rails being parallel to said second edge.

47. An installation according to claim 43, wherein said container is substantially annular and said first edge and second edge are substantially circular inner and outer peripheries of the container, said support means for the pairs of threads or wires being arranged along concentric lines, the installation further comprising concentric pairs of rails on said bottom wall along which pairs of rails each autonomous unit is capable of travelling for the purpose of shifting the autonomous units to different sectors of the container for exerting said thrusts in each different sector.

48. An installation according to claim 30, wherein at least some of said thrust elements are small upright rods for engaging at least the plant objects adjacent to said first edge of the container.

49. An installation according to claim 31, wherein at least some of said thrust elements are small upright rods for engaging at least the plant objects adjacent to said first edge of the container.

50. An installation according to claim 33, further comprising means for gaining access to said first edge of the container for facilitating the planting of the plant objects adjacent to said first edge.

51. An installation according to claim 30, wherein said thrust elements have widths which gradually increase from said inner edge to said second edge.

52. An installation according to claim 31, wherein said thrust elements have widths which gradually increase from said inner edge to said second edge.

* * * * *